United States Patent [19]
Starck
[11] Patent Number: 4,953,836
[45] Date of Patent: Sep. 4, 1990

[54] WORK HOLDER APPARATUS

[76] Inventor: Mark Starck, 1228 Fourth St., Berthoud, Colo. 80513

[21] Appl. No.: 326,082

[22] Filed: Mar. 20, 1989

[51] Int. Cl.[5] ............ B23Q 1/04

[52] U.S. Cl. ............ 269/17; 269/239; 269/32; 269/258

[58] Field of Search ............ 269/158, 159, 32, 137, 269/139, 258, 133, 221, 17, 71

[56] References Cited

U.S. PATENT DOCUMENTS

| | | | |
|---|---|---|---|
| 611,340 | 9/1898 | Smith . | |
| 1,489,964 | 4/1924 | Powers | 269/239 |
| 1,827,258 | 10/1931 | Payzant . | |
| 2,209,379 | 7/1940 | Bell . | |
| 2,503,338 | 9/1950 | Hedlund . | |
| 3,056,600 | 10/1962 | Merrick . | |
| 3,338,573 | 8/1967 | Lukas . | |
| 3,861,662 | 1/1975 | Morse . | |
| 4,050,671 | 9/1977 | Coleman . | |
| 4,138,099 | 2/1979 | Englehart | 269/17 |
| 4,211,394 | 7/1980 | Sampson | 269/239 |
| 4,586,701 | 5/1986 | Oncken | 269/221 |
| 4,729,552 | 3/1988 | Pempek | 269/239 |
| 4,799,658 | 1/1989 | Ponce | 269/133 |

*Primary Examiner*—Robert C. Watson
*Attorney, Agent, or Firm*—John E. Reilly

[57] ABSTRACT

Work holder apparatus for clamping large workpieces in position to carry out finishing operations comprising a base support unit, spaced parallel upright support members disposed thereon and extending upwardly to define a generally channel-shaped opening for insertion of a workpiece in the channel, a movable clamping member mounted on one of the support members including a workpiece-engaging surface in facing relation to the other of the support members, and clamping control means for horizontally advancing the clamp member toward and away from the other of the frame members.

11 Claims, 2 Drawing Sheets

WORK HOLDER APPARATUS

This invention relates to material handling apparatus; and more particularly relates to a novel and improved apparatus for supporting and handling large workpieces, such as, doors, countertops and the like for various finishing operations.

BACKGROUND AND FIELD OF THE INVENTION

Large workpieces, such as, door panels and countertops present particular problems in handling and especially in performing various finishing operations, such as for instance, sanding, filing, routing or the addition of hardware accessories. Vises have been employed in the past for holding smaller workpieces or articles so that a single person may perform different operations, but cannot be satisfactorily used in supporting larger workpieces. Accordingly, larger clamping devices have been proposed in an effort to support a workpiece in performing different finishing operations; however, such devices have not been found to be entirely satisfactory from the standpoint of rigidly positioning the workpiece in an upright position without danger of slipping or marring of the workpiece.

Representative of the approaches taken in the past is that disclosed in U.S. Pat. No. 4,138,099 to C. C. Englehart which provides a horizontal channel and a padded clamp centrally of the channel so that the panel can be positioned on one side edge in the channel and secured in place. One end of the channel is provided with wheels so that the door panel can be transported to different locations and the door raised into an upright position for hanging purposes but does not enable the door or other panel to be supported in an upright position in the performance of other operations. Other patents disclose apparatus similar to that of Englehart and, for example, reference is made to U.S. Pat. No. 4,050,671 to R. J. Coleman and U.S. Pat. No. 3,861,662 to C. W. Morse as well as U.S. Pat. No. 2,503,388 to C. L. Hedlund.

Another important consideration in the clamping of large panel structures is to provide a clamping device which will exert a substantially uniform pressure over a relatively wide area so as to avoid undue concentration and pressure at any one point. Nevertheless, the clamping device should be capable of compensating for irregularities or unevenness in thickness of the workpiece so as to exert a uniform pressure across the panel. Self-compensating cylinders have been devised for use with a clamp to balance the pressure or force applied across the clamping area; and representative patents showing different types of clamping devices are shown in U.S. Pat. No. 3,338,573 to Lukas, U.S. Pat. No. 2,209,379 to M. A. Bell and U.S. Pat. No. 3,056,600 to J. I. Merrick. None, though, suggests a way of employing the device as a part of a work holder for large items. In this relation, in clamping large workpieces it is desirable to position the clamping device at a point spaced as far away from the supported end of the workpiece as possible and to afford the widest possible range in movement of the clamping device in moving into engagement with the workpiece. For instance, in clamping a door panel, it is most effective to support the bottom edge of the door while exerting a clamping force across a broad surface adjacent to the upper or opposite end of the door.

SUMMARY OF THE INVENTION

Accordingly, it is an object of the present invention to provide for a novel and improved apparatus for supporting large workpieces for various finishing operations to be performed.

Another object of the present invention is to provide for a novel and improved workholder apparatus for supporting and clamping large workpieces, such as, doors, countertops and the like in an upright position so that various finishing operations, such as, sanding, filing, addition of hardware accessories can be carried out by one person rapidly and easily in an efficient manner.

It is a further object of the present invention to provide for a novel and improved workholder apparatus which is conformable for use in supporting and clamping different sized workpieces in an upright position and wherein the apparatus is readily transportable from one site to another.

A further object of the present invention is to provide in a workholder apparatus for a novel and improved clamping device which can be hand or foot operated and is self-compensating for any irregularities in thickness of the workpiece to enable uniform pressure to be exerted across the bearing surface of the clamping member against the workpiece.

A still further object of the present invention is to provide in workholder apparatus for a novel and improved clamping means for clamping large workpieces in an upright position for subsequent finishing operations in which the clamping means exerts a clamping force over a large bearing surface to minimize any danger of placing undue pressure on the workpiece in a concentrated area.

In accordance with the present invention, work holder apparatus has been devised for clamping large workpieces, such as, panels or panel-like members in position to carry out finishing operations, the apparatus comprising a base support unit, spaced parallel upright support members disposed on the base support unit and extending upwardly to define a generally channel-shaped opening for insertion of a workpiece in the channel, a movable clamping member mounted on one of the support members including a workpiece-engaging surface in facing relation to the other of the support members, and clamping control means for horizontally advancing the clamp member toward and away from the other of the frame members. Preferably, the clamping control means includes an arm member extending upwardly from pivotal connection to the base support, and the clamping member is pivotally connected to the upper end of a pivotal arm for movement into and away from engagement with the workpiece under the control of fluid-actuated cylinders.

The above and other objects of the present invention will become more readily appreciated and understood from a consideration of the following detailed description of a preferred embodiment when taken together with the accompanying drawings wherein:

DETAILED DESCRIPTION OF THE PREFERRED EMBODIMENT

Figure 1:
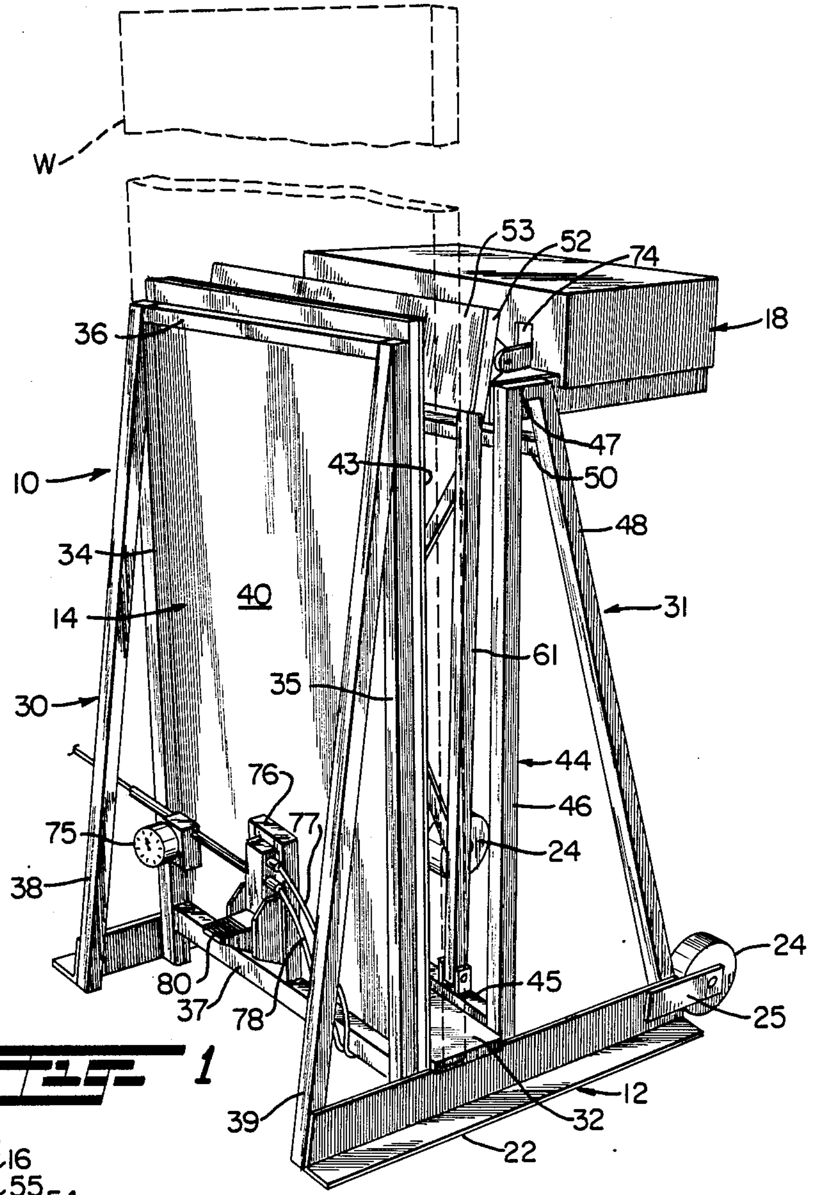
FIG. 1 is a perspective view of a preferred form of work holder apparatus in accordance with the present invention.

Referring in more detail to the drawings, there is illustrated in FIGS. 1 to 5 a preferred form of a work-holder apparatus 10 which is intended for use in supporting large workpieces, such as, door panels, counter-tops and the like in an upright position. Further, the apparatus is designed to rigidly clamp the workpiece in order to enable finishing operations to be performed, such as, sanding, filing and the like that would customarily be performed by a carpenter as a preliminary to installation. To this end, the apparatus 10 is broadly comprised of a base support unit 12, upright workpiece support assembly 14, and a clamping member 16 stationed at the upper end of the support assembly and regulated by a clamping control mechanism 18 to cause the clamping member to move into and out of engagement with a workpiece W. In the preferred form as shown, a door panel is generally representative of various different workpieces that may be positioned in a channel 20 which is formed between the support assembly 14 and the base support 12.

The preferred form of base support 12 comprises a pair of spaced horizontal skids 22 that are rigidly interconnected in spaced parallel relation to one another by the support assembly 14 in a manner to be described, and a roller or castor 24 is mounted on a horizontal extension 25 extending rearwardly from each skid 22 so that the entire apparatus can be tilted onto the rollers 24 and wheeled into different positions. Normally, the apparatus will rest on the skids with the rollers 24 raised slightly above the ground or floor surface.

The upright support assembly 14 comprises a pair of stationary frame sections 30 and 31 of generally triangular configuration and mounted in facing relation to one another between the skids 22. The spacing between the frame sections 30 and 31 is such as to define an open-sided channel 20 and of a width to accommodate workpieces W of different thicknesses or sizes between the frame sections. A support plate 32 defines the lower end of the channel 20 and rests on the upper edges of the skids 22 for extension across the skids and between the frame sections 30 and 31. The frame section 30 includes an open, generally rectangular frame 33 comprised of vertically extending frame members 34 and 35, horizontal top and bottom frame members 36 and 37 and the lower ends of the vertical frames 34 permanently affixed, such as, by welding to the inner facing surfaces of the skids 22. The frame section 30 is reinforced by downwardly and rearwardly inclined braces 38 and 39 which are affixed at their upper ends to the upper corners of the frame section 30 and at their lower ends to the inner surfaces of the skids 22. A vertical support panel 40 is mounted on the frame section 30 on a side opposite to the extension of the braces 38 and 39 and traverses the entire length and width of the rectangular frame 33. The panel 40 preferably is made up of a solid wood panel with a rubber or rubber-like surface 43 in facing relation to the channel 20. The panel 40 is permanently attached to the frame 33 by extension of suitable connecting bolts, not shown, through the outer peripheral edge of the panel 40 into the frame members 34, 36 and 37.

The frame section 31 is comprised of a generally rectangular frame 44 consisting of vertically extending frame members 46 connected at their lower ends to an inner surface of each skid 22 and interconnected by a frame member 45 across the lower ends of the vertical frames 46. The upper end of each frame member 46 terminates in a horizontal frame portion 47 and a brace 48 inclines rearwardly and downwardly from the portion 47 for connection to the rearwardmost inner surface portion of the skid 22 on each side of the assembly. Another horizontal frame 50 extends between upper ends of the brace members 48 to rigidify the upper end of the frame section 31.

It should be noted that the upper end of the frame section 31 and specifically the frame portions 47 terminate at a height slightly below that of the upper end of the frame section 30. The clamping member 16 is supported at the upper end of the frame section 31 for advancement into clamping engagement with the workpiece W at a location across from the upper end of the frame section 30 and removed from the lower closed end of the channel 20 as defined by the support plate 32. Preferably, the clamping member 16 is defined by a wooden rectangular panel 52 having a padded surface 53 in facing relation to the panel 40 but on the opposite side of the channel 20. The clamping member 16 is mounted on a pair of horizontally spaced brackets 54 having upper and lower angle members 55 and 56 affixed to the rear surface of the member 16, and the brackets are pivotally connected at their rearward ends to pivot links 58 on cylinder rods 59 at the leading ends of doubleacting cylinders 60 which form a part of the clamping control mechanism. A pair of pivotal arm members 61 extend upwardly from pivotal connection to the lower horizontal frame 45 and terminate in upper ends 62 which are pivotally connected as at 63 to the brackets 54 at points forwardly of the points of pivotal connection of the brackets 54 to the cylinder rods 59. In this way, the pivotal arm members 61 vertically support the clamping member 16 in a generally vertical attitude for advancement into engagement with the workpiece under the urging of the cylinders 60.

The clamp control mechanism 18 is mounted on a generally horizontal platform or bed 66 which extends horizontally and rearwardly away from the upper frame portion 47. The platform 66 includes a pair of rearwardly extending frame members 67 which are interconnected at their rearward ends by a common angle or frame member 68, and the front ends of the frame members 67 are rigidly affixed to the upper frame portions 47. The cylinders 60 are each pivotally connected at their rearward ends to a mounting bracket 70 positioned on the rear angle 68 so that the control cylinders will extend forwardly in a horizontal direction for connection into the brackets 54 as described. A cover 72 is removably positioned over the control cylinders with front access slots 74 for extension of the cylinder rods into connected relation to the brackets 54.

Figure 4:
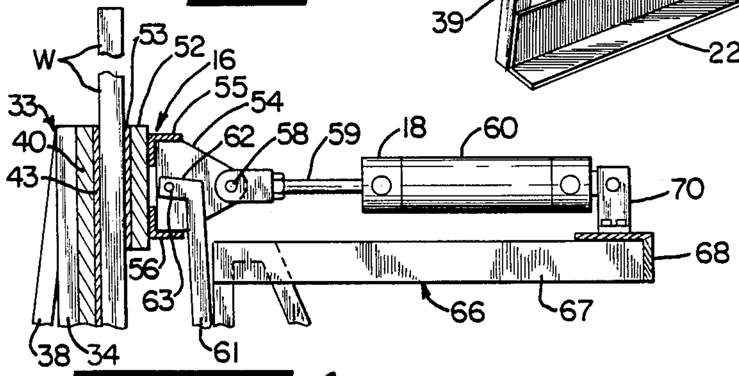
FIG. 4 is a somewhat fragmentary view illustrating movement of the clamping device of the preferred form of invention into a workpiece-engaging position.
Figure 5:
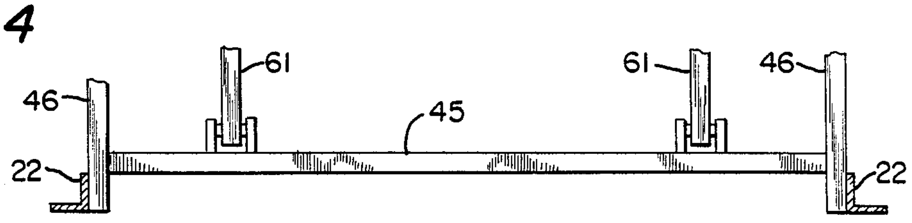
FIG. 5 is a cross-sectional view taken about lines 5—5 of FIG. 3.
Figure 2:
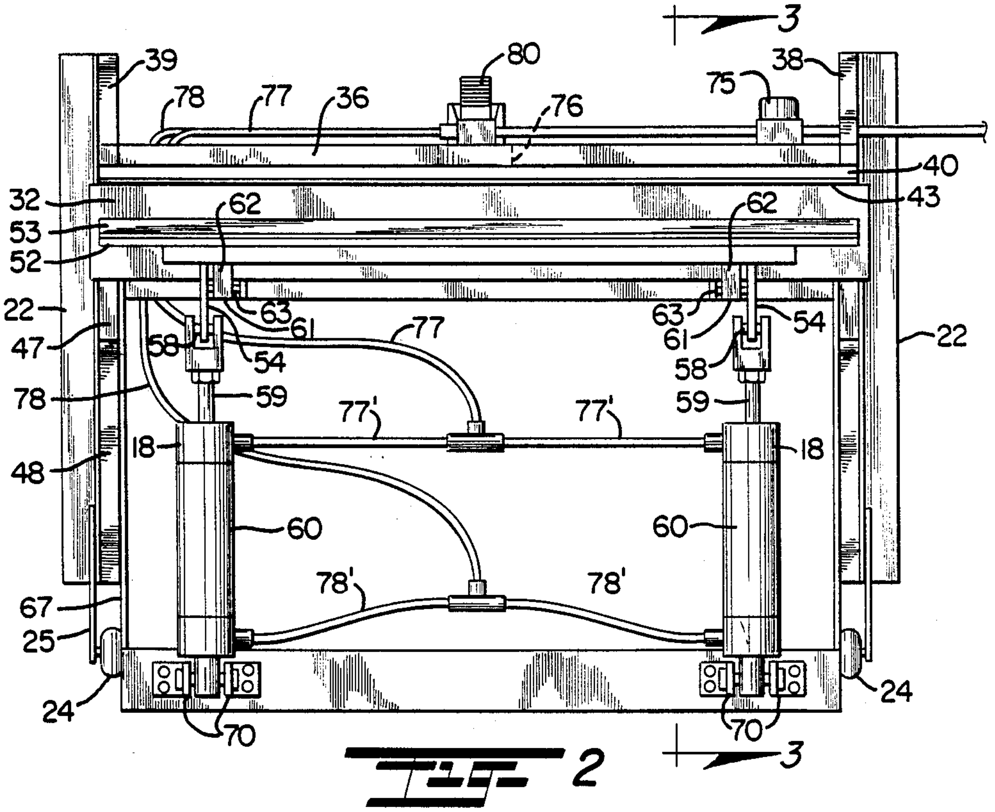
FIG. 2 is a top plan view of the invention shown in FIG. 1.
Figure 3:
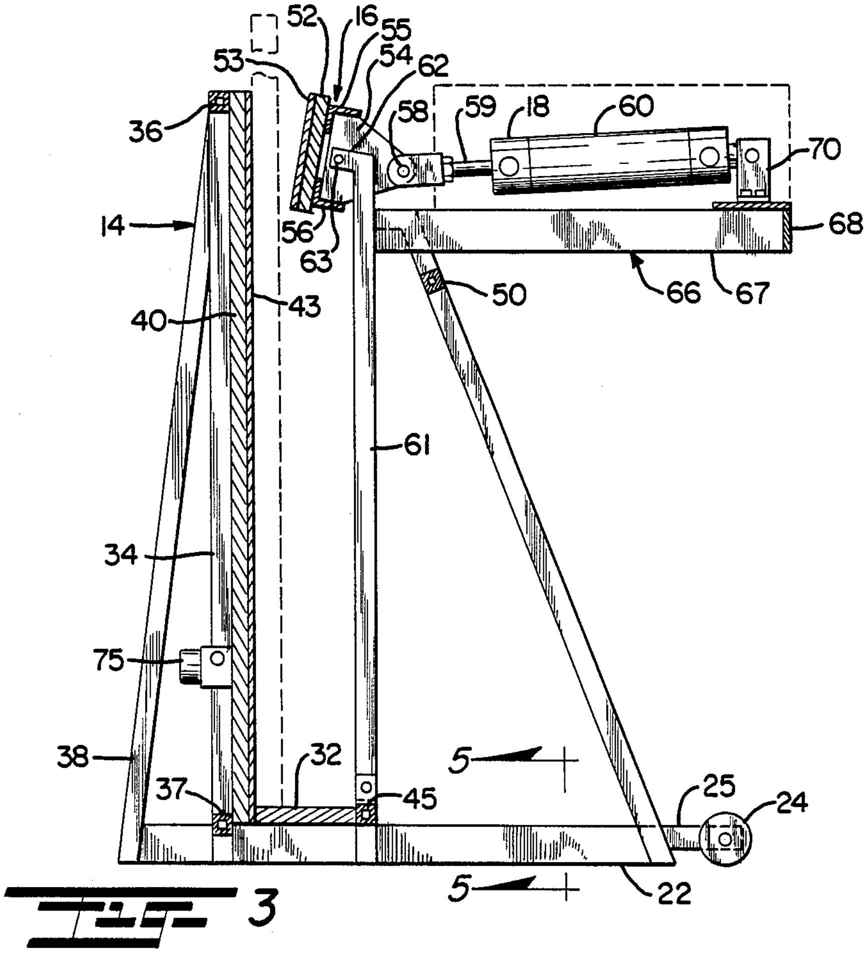
FIG. 3 is a cross-sectional view taken about lines 3—3 of FIG. 2.

As best seen from FIGS. 1 and 2, the control cylinders 60 are fluid-actuated, such as, by delivery of air under pressure from an air pressure source, not shown, through a pressure regulator 75 into a four-way valve 76. Delivery/return lines 77 and 78 extend from the four-way valve into branch lines 77′ and 78′, respectively, leading into each of the control cylinders 60. The four-way valve 76 is preferably mounted on the panel 40 and provided with a foot control 80 so that the operator can control movement of the clamping member into and out of engagement with the workpiece while leaving his hands free to manipulate the workpiece W. One suitable form of valve system is the four-way International valve 8N521 384 sold by Watts Fluid Air of Kittery, ME and which valve unit includes a foot pedal control as illustrated. The pressure regulator 70 may be any one of a number of commercially available regulators and, for example, may be set to operate the clamping device between a pressure level or range of 80 psi to 120 psi. Foot pedal operation will cause the fluid or air under pressure to be delivered via one of the lines 77 and 78 either to the front ends of the cylinder to cause retraction of the clamping member away from the workpiece or to the rearward ends of the cylinders 60 to cause forward advancement into engagement with the workpiece. Thus when delivered through the line 77, the line 78 will act as a return line and vice versa. It will be noted that when the clamping member is retracted it will be tilted upwardly and rearwardly about the pivot point 63 of the arm members 61. Conversely, when the clamping member 16 is advanced toward the workpiece, it will initially engage the workpiece along the bottom or lower portion of the member 16 and continued advancement will cause the upper end to gradually advance into flush engagement with the workpiece, as illustrated in FIG. 4.

It will be evident from the foregoing that while the preferred form of invention has been described specifically in relation to its use for clamping and supporting larger workpieces, such as, door panels and countertops it is readily conformable for use in holding other sizes and shapes of articles. For instance, smaller articles may be securely clamped between the stationary panel 40 and the clamping member 16 so as to be held at shoulder level. Furthermore, the open-sided channel 20 as shown and described facilitates insertion of the workpieces into position as well as their removal. All of the frame members and braces referred to in the preferred form are preferably made up of angle iron members for utmost strength and rigidity in handling the larger workpieces. Nevertheless, it will be apparent that different frame or support constructions may be employed. Similarly, while the padded surface portions on the panel 40 and clamping members are preferably a rubber or rubber-like material and cork material, respectively, other surfacing materials may be utilized.

It is therefore to be understood that while a preferred embodiment of the present invention is set forth and described herein, various modifications and changes may be made without departing of the spirit and scope of the present invention as defined by the appended claims and reasonable equivalents thereof.

I claim:

1. Work holder apparatus for handling large workpieces, such as, doors, countertops and panels comprising:

a base support member;

a pair of spaced upright frame members disposed on said base support unit and extending upwardly from said unit with a common channel therebetween for insertion and positioning of a workpiece in said channel;

a movable clamping member including means piviotally mounting said clamping member adjacent to an upper end of one of said frame members for movement toward and away from the other of said frame members, and a workpiece-engaging surface on said clamping member in facing relation to said other of said frame members; and clamp control means for horizontally advancing said clamping member toward and away from said other of said frame members whereby to rigidly clamp said workpiece in said channel, said clamp control means including fluid-actuated cylinder means engageable with said clamping member, and means for actuating said cylinder means to cause pivotal movement of said clamping member toward and away from the workpiece in said channel.

2. Apparatus according to claim 1, said other of said frame members defined by a generally rectangular frame member elongated in a vertical direction upwardly from said base support unit.

3. Apparatus according to claim 1, said clamping member being of a width substantially corresponding to the width of the other of said frame member.

4. Work holder apparatus for handling elongated panels for finishing operations comprising:

a wheeled base support unit;

first and second spaced upright support members disposed on said base support unit and extending upwardly from said unit with a common channel therebetween for upright insertion and positioning of a panel in said channel;

a movable clamping member including an elongated vertically extending arm member pivotally connected to said base support unit, a workpiece-engaging surface on said clamping member in facing relation to said second support member; and clamp control means for advancing said clamping member toward and away from said second support member whereby to rigidly clamp said workpiece in said channel, said clamp control means including a pair of fluid-actuated cylinders mounted on said first support member, said cylinders including cylinder rods pivotally connected to said clamping member in spaced horizontal relation to one another, there being a pair of said arm members extending upwardly from said base support member pivotally connected to said clamping member in substantially horizontal spaced relation to the pivotal connection of said cylinder rods to said clamping member.

5. Apparatus according to claim 4, said support members each defined by a generally rectangular frame member elongated in a vertical direction upwardly from said base support unit and a padded surface on said second frame member in facing relation to said channel.

6. Apparatus according to claim 5, said clamp control means pivotally connected to said clamping member and said clamping member pivotally connected to an upper end of said arm member for pivotal movement of said clamping member about spaced horizontal axes.

7. Apparatus according to claim 1, said cylinder means including a pair of fluid-actuated cylinders engageable with spaced horizontal portions of said clamping member, and foot control means for actuating said cylinders to cause pivotal movement of said clamping member toward and away from the workpiece in said channel.

8. Apparatus according to claim 4, each of said first and second support members rigidly connected to said base support unit, and a support plate extending between said first and second support members to define a lower closed end of said channel.

9. Apparatus according to claim 4, said base support unit including rollers at one end thereof in normally spaced relation above a floor surface.

10. Apparatus according to claim 5, said clamping member having a padded surface portion engageable with said workpiece, said second frame member extending to a height above said clamping member.

11. Work holder apparatus for handling elongated panels for finishing operations comprising:

a wheeled base support unit, said base support unit including a pair of horizontally extending skids and a roller at one end of each said skid, said rollers raised above the surface of the floor when said apparatus is in normal upright position;

first and second spaced upright support members disposed on said base support unit and extending upwardly from said unit with a common channel therebetween for upright insertion and positioning of a panel in said channel, and said first and second support members defined by generally triangular frame sections rigidly interconnecting said skids in spaced parallel relation to one another;

a movable clamping member including an elongated vertically extending arm member pivotally connected to said base support unit, a workpiece-engaging surface on said clamping member in facing relation to said second support member; and clamp control means for advancing said clamping member toward and away from said second support member whereby to rigidly clamp said workpiece in said channel.

* * * * *